United States Patent [19]

Silver

[11] 4,096,663
[45] Jun. 27, 1978

[54] PLANT WATERING SYSTEM AND PROCESS

[76] Inventor: Stanley Milton Silver, 1331 Lincoln Rd. #705, Miami Beach, Fla. 33319

[21] Appl. No.: 800,185

[22] Filed: May 25, 1977

[51] Int. Cl.² ............................................. A01G 27/00
[52] U.S. Cl. ........................................................ 47/80
[58] Field of Search ........................................ 47/79–81

[56] References Cited

U.S. PATENT DOCUMENTS

| 918,563 | 4/1909 | Lewis | 47/80 |
| 2,055,844 | 9/1936 | Kneller | 47/79 |
| 2,172,514 | 9/1939 | Lockyer | 47/81 |
| 3,192,665 | 7/1965 | Cloud | 47/80 |
| 3,903,644 | 9/1975 | Swift et al. | 47/79 |

FOREIGN PATENT DOCUMENTS

| 876,944 | 9/1961 | United Kingdom | 47/80 |

*Primary Examiner*—Robert E. Bagwill
*Attorney, Agent, or Firm*—Charles A. Laff; J. Warren Whitesel; Howard B. Rockman

[57] ABSTRACT

A plant watering system comprises a porous inner pot at an elevated location within a water-impervious outer container. Water within the outer container wicks by capillary action up the side walls of the porous pot and wets any soil or like medium contained within the inner pot. The lower part of the inner pot is coated with a water-impervious layer to control the elevation at which the wicking water may enter the soil. Also, a special pot liner enables gases to be bi-directionally vented throughout a selected region in the bottom of the inner pot. When desired, water may be drained out the bottom of the inner pot. The inventive process adjusts the percentage of moisture maintained by soil, or the like, by rating the moisture needs of plant species, the season of the year, and the type of growing medium used. Such a process enalbes a plant grower to select a preferred level of water in the outer container, and therefore the distance over which the water must travel by capillary action through the porous wall. That distance regulates the amount and rate at which the soil is replenished with moisture.

27 Claims, 8 Drawing Figures

PLANT WATERING SYSTEM AND PROCESS

This invention relates to self- or auto-moisturizing containers for plants. More specifically, it relates to auto-moisturizing containers that recognize the physiological and cultural requirements of most plant species and provides a simple, dependable and practically automatic system that enables conventional plant owners to care for their plants more effectively than was heretofore conveniently possible.

The number of ornamental house plants sold annually has grown dramatically in recent years. However, many of these plants fail during the first year after their sale owing to improper watering. The problem of correct watering is ever present, whether the plant is at the growers, in transit, on the retailer's shelf or in the consumer's home.

Although one generally thinks of proper moisturizing as merely providing water for a plant, this is not botanically correct. Properly watering a plant, in fact, is the attempt to provide a proper balance of moisture and oxygen for the root system; both are equally essential.

In soil, moisture and oxygen are present in an inversely proportionate ratio. Thus, as the moisture content of the soil increases, the oxygen level decreases. A severe imbalance between oxygen and water, to the disfavor of either, reduces, if not stops, photosynthesis.

For many plant species, "overwatering" actually has little or nothing to do with an excess of water. More likely, the root system of the plant is deprived of an adequate supply of essential oxygen. For example, many plants can be successfully grown with their root systems completely submerged in water if a proportional increase in the oxygen supply is made available. An area of agriculture called "hydroponics" has long used this form of cultivation.

The maintenance of a proper moisture/oxygen balance optimizes the photosynthetic process for a plant and, therefore, a plant's growth, assuming that other essential environmental factors are present. If the percentage of soil moisture is reduced, the plant roots must spend additional energy in order to osmotically obtain moisture. This necessarily diminishes the energy which would otherwise by available for growth. A deprivation of oxygen by "overwatering" similarly reduces the growth process.

Most ornamental house plants carry out photosynthesis most efficiently when the moisture percentage in the soil is between 50–70%, which is the optimal moisture/oxygen balance. Certain plant species experience stress if the moisture level drops to approximately 40%. Conversely, other species experience oxygen deprivation if the moisture level is above the 80% level.

Plant roots develop randomly and omni-directionally, but survive in any direction only to the extent that moisture is immediately encountered and assimilable. When aridity is encountered, the most efficient fine root endings quickly atrophy. Thus, to achieve optimal growth, the majority of container plants require "evenness" of moisture. By "evenness" I refer to the percentage of moisture present in the soil, the spatial distribution of the moisture, and the mean moisture level over time, not merely the average moisture level.

It may initially appear to be a simple matter to maintain a 50–70% moisture level evenly distributed in the soil, but plant owners find that to do so is not practically possible. By way of illustration, consider the conventional watering of a house plant. If one follows the recommended teachings and begins by saturating the soil mass, the immediate condition of the soil is 100% capillary moisture. Until the moisture level drops below 80%, photosynthesis is limited by a shortage of oxygen. Typically, most house plants will stay 100% moist for two days after being saturated. For the subsequent two days, the moisture level will most often remain between 70 and 50% and on the 5th day the soil is semi-arid. Depending on the attentiveness of the plant owner, this arid condition may continue for a number of additional days, often causing residual damage. Thus, during a typical watering cycle, the plant usually experiences an optimal moisture/oxygen balance during only a small portion of the time.

If the "evenness" of the moisture distribution is also examined, it is found that the entire root system is not exposed to an "even" distribution of moisture. Rather, it usually encounters a concentration of moisture in the lower region of the plant container. This diminishes the size of the root system upon which the remainder of the plant's growth depends.

While the prior art has recognized that properly watering a plant is a difficult matter, the solutions put forward to date have failed to recognize the physiological aspects of moisture/oxygen balance and moisture "evenness". Because of this failure, the solutions offered by the prior art have not found wide acceptance. These prior art auto-watering systems usually use (1) a porous barrier; (2) air pressure to balance the flow of water; and/or (3) a wicking tube.

Consider, for example, the typical prior art involving auto-moisturizing systems. One broad category, and perhaps the most relevant prior art for purpose of applicant's invention, is illustrated by the following patents: Radford, U.S. Pat. No. 2,863,259; Vallinos, U.S. Pat. No. 2,344,794; Damm, West German Pat. No. 814,964; and Leon, French Pat. No. 2,142,234. This group of auto-moisturizing systems provides a reservoir of water that surrounds a porous plant container, such as a clay pot. The primary deficiency with this category is that the porous container cannot properly regulate the flow of water from the reservoir to the entire soil mass. Moreover, the variability in porosity of these natural materials often contributes to overwatering. The moisture level of even lean soil using this type of device is normally near the 100% level, until the reservoir dries out.

Another difficulty with this category of auto-moisturizers is that most moisture is introduced via the bottom of the reservoir, responsive to gravity and hydraulic pressure. This results in a concentration of moisture in the base of the pot, with the upper regions of the soil being lesser moisturized by capillary action. Most plants located in such a container experience substantial oxygen deprivation, most particularly at a lower region.

Some of the inventors have used various forms of valves that reduce the amount of water flowing from the reservoir into the soil. While attacking the problem of constant saturation, the devices offered to date have either failed to reliably regulate moisture flow or they are costly and complicated.

A second category of the prior art recognizes that overwatering is injurious to plant health and seeks to regulate the water flow by encapsulating the exterior walls of the plant pot within a hermetic chamber. This arrangement utilizes atmospheric pressure to control the amount of moisture that reaches the soil. However, the soil must undergo periods of dryness prior to stimulating the flow of moisture. These structures also diminish the respiratory gas exchange which is needed by the roots. While a conventional clay pot normally provides for excellent aeration, such aeration is inhibited when the pot is partly encapsulated by a hermetic chamber. In addition, by so enclosing a pot, there can be no flow of free liquid through the pot base. Thus, it may no longer be possible to flush the soil, which is normally required on a periodic basis. Relevant prior art patents known to the inventor in this group consists of: Cloud, U.S. Pat. No. 3,192,665; Peters, U.S. Pat. No. 3,775,904; and Crane, U.S. Pat. No. 3,758,987.

The third major category of prior art employs a wicking principle to transfer water from a reservoir to the soil. Basically, a watering system using a wick has a water reservoir and a wicking tube. One major drawback is that, if the wick dries out at any place along its length or it becomes dislodged from the soil, moisture transmission ceases. Another shortcoming is that the moisture transmitted by the limited area of a wicking tube may be unable to amply replace the moisture lost by the soil in the plant container under warm dry conditions. The wicking system also fails to provide required "evenness" of moisture because moisture is introduced locally to the soil.

A plant moisturizing system can accelerate growth of plants if it can dependably achieve the proper moisture/oxygen balance, along with the necessary "evenness" of the moisture. If such a system can accomplish this result automatically over an extended period of time with little maintenance, both plants and hobbyists are benefited. The system can measurably improve the growth rate and saleability, and reduce loss of commercially grown plants.

The present invention recognizes the major physiological needs of living plants and provides an auto-moisturizing system, which overcomes the various shortcomings of the prior art, in a simple, inexpensive, dependable and easy manner.

One embodiment of the present invention employs a conventional clay pot (as defined herein such a pot may comprise side walls only) having a water-impermeable coating surrounding a portion of the interior wall of the pot. The clay pot is joined to an outer container by a watertight adhesive seal, situated so that excess water is readily drainable from the soil mass and air is allowed to freely communicate with much of the soil mass. The exterior of the clay pot faces the outer container, with a water reservoir thereby formed between them. Water in the reservoir cannot come into direct contact with the soil. Rather, moisture wicks up the clay pot walls to the top of the coating over which it may wet the contacting soil.

Accordingly, an object of this invention is to provide new and improved auto-moisturizing containers for plants wherein the moisture/oxygen balance within the soil can be maintained in the optimal range for extended periods.

Another object of the invention is to provide auto-moisturizing plant containers that can distribute moisture with an improved "evenness" so as to maximize the sustained development of the root system.

Another object of the invention is to provide an auto-moisturizing plant container that introduces moisture broadly at an uppermost part of the soil mass, thereby simulating natural outdoor watering conditions.

Still another object of the present invention is to enable the use of ordinary clay pots in the construction of the inventive device by overcoming the variability in their moisture transmission rates, thereby providing a select and standardized moisture transmission rate.

Another object of the present invention is to provide a cooperating reservoir surface that can be adhered to a conventional clay plant pot container by a sealing arrangement that does not interfere with the usual drainage and aeration functions of the porous pot.

Another object of the present invention is to provide a water reservoir that enables the user to visually estimate the period of time that the reservoir has been empty.

Yet another object of the present invention is to provide a special fitment at and near the bottom of the porous pot that increases the aerating and evaporation surface thereat to approximately equal that of the cross-sectional area of the top of the pot.

Still another object of the present invention is to provide an exterior container having a shape which is completely without undercuts so it may be manufactured by inexpensive manufacturing techniques, e.g., pressed glass, vacuum and injection molding of plastics.

The present invention will be more clearly understood from the following description of a preferred embodiment, which may be read in conjunction with the accompanying drawings, wherein.

Figure 6:
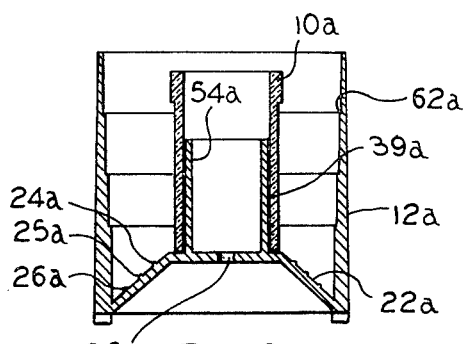
Figure 7:
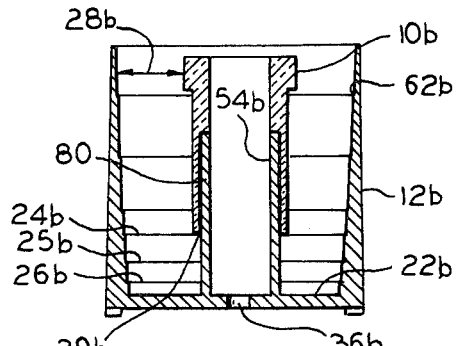
Figure 5:
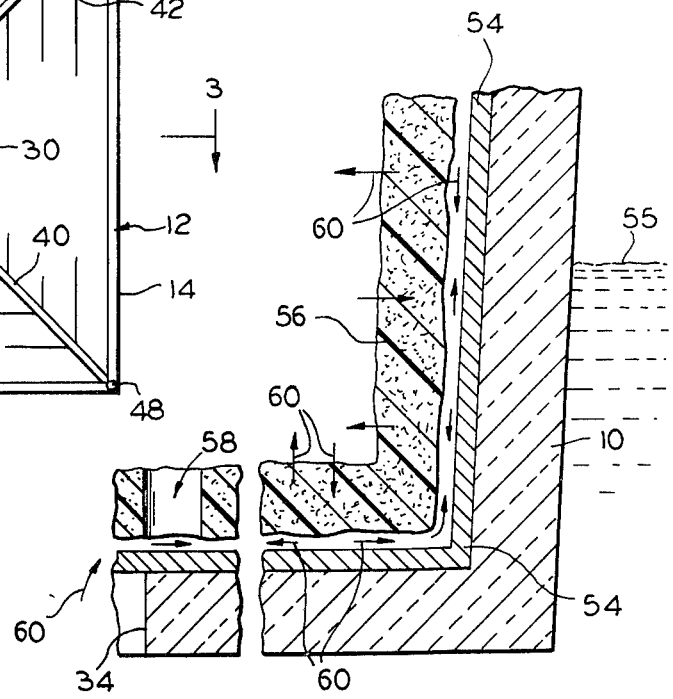

FIG. 5 schematically indicates how the plant roots are aerated;

FIG. 6 is a cross-sectional representation of a first alternative embodiment utilizing a clay tile with a plastic partial liner; and FIG. 7 is a cross-sectional representation of a second alternative embodiment modifying the structure of FIG. 6.

Figures 1, 2, 2A:
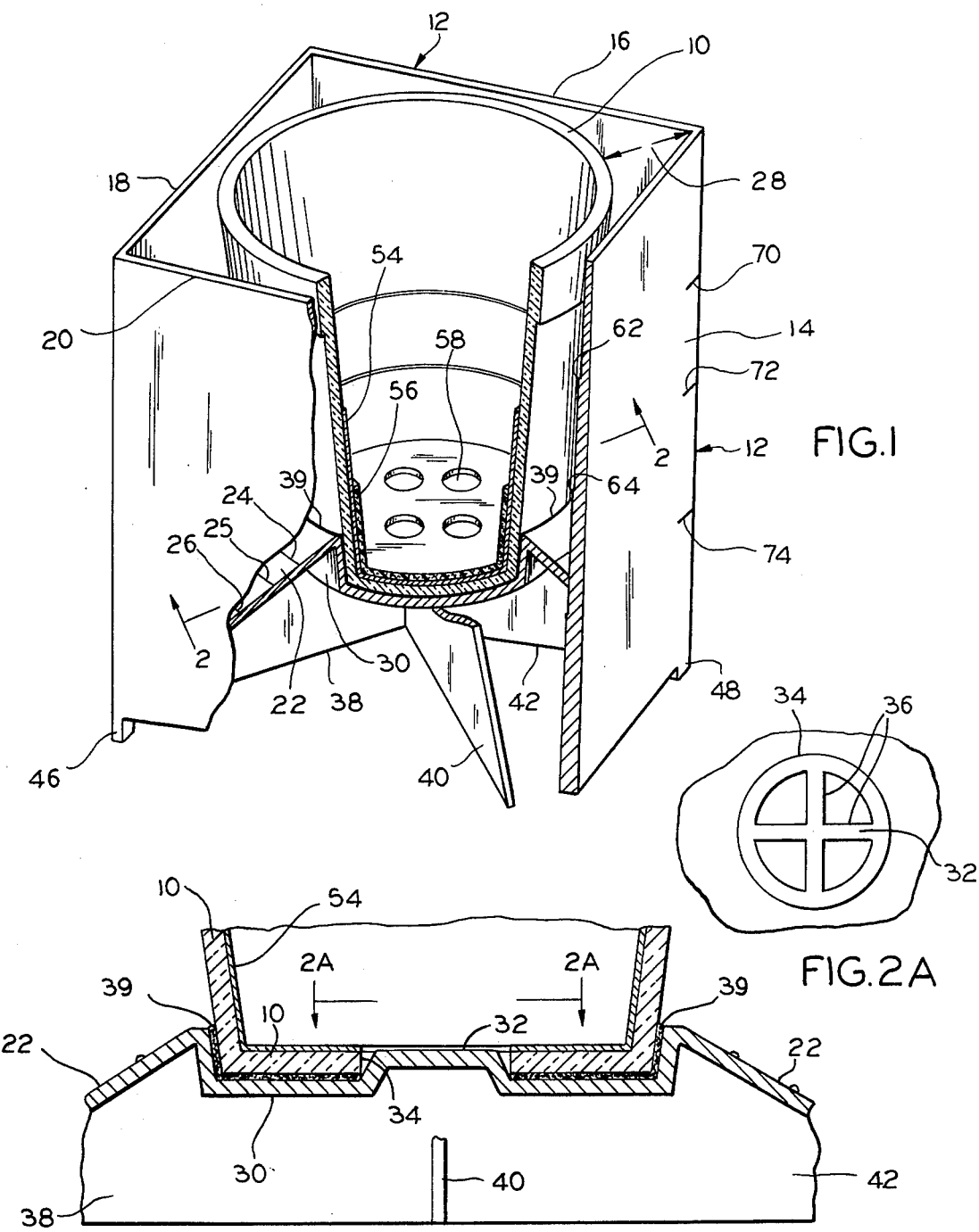
FIG. 1 is a perspective view, partially in cross section, which shows the inventive plant-watering system.
FIG. 2 shows, in cross section, the bottom of a clay pot and its supporting structure, taken along line 2—2, of FIG. 1.
FIG. 2A is a fragmentary cross section of FIG. 2, taken along line 2A—2A thereof, and showing a collar construction in a drainage hole.

In FIG. 1, a preferred embodiment may employ conventional porous clay pot 10 seated in a water-impervious container 12, of any suitable material, such as plastic, glass, or coated permeable substrates, etc. While outer container 12 is here shown in a rectangular, nearly parallelepiped configuration, it may take any convenient form, including decorative shapes (the deviation from a a regular parallelepiped configuration is a slight taper to provide a mold draft).

The outer container 12 has four vertical walls, 14, 16, 18, 20 and a bottom 22 of preferably frusto-conical shape, in that it extends upwardly and inwardly from the base of the outer walls. Graduated markings 24, 25, 26 are formed on bottom 22 to indicate the number of days that a reservoir 28 formed between the pot 10 and container 12 has failed to supply water to the plant, as more fully explained hereinafter. At its center, bottom 22 terminates in a downwardly extending collar 30 which receives the base of clay pot 10.

As more clearly shown in FIG. 2, collar 30 engages and surrounds a portion of the bottom region of clay pot 10. The collar 30 has a central region 32 that is embossed inwardly to fit through an enlarged drainage hole 34 formed in a clay pot 10 and to rise to a level parallel with the interior bottom of the pot. Thus, the central region 32 of base collar 30 occupies the drainage hole provided in conventional clay pots. Referring to FIG. 2A, the design of the central embossed region 32 consists of an open cross-bracing 36 that forms open regions for allowing drainage and aeration. The lower region of the clay pot 10 is adhered to collar 30 by any suitable waterproof adhesive 38, whereby a waterproof seal to the reservoir results therefrom.

Spaced circumferentially and equally about the bottom of collar 30 is a plurality of struts 38, 40, 42, 44 that support the collar 30 and the clay pot 10. A plurality of risers or feet 46, 48, 50, 52 raise the outer container and enable air to circulate underneath the container 14 and communicate with the openings formed between the cross-braces 36 in the central region 32 of the collar. When the soil is flushed, water may freely drain from the soil mass and out through the clearance space provided by the feet 46–52. By raising the bottom of clay pot 10 above the bottom edge of vertical walls 14–20, water is allowed to freely escape from the clay pot 10 and not to collect inside the pot around the drainage opening 34, and air is allowed to freely circulate under the bottom of clay pot 10 through the opening 34.

While pot 10 has been identified as being made of clay, it may be made of any other suitably adapted porous material. The drainage opening 34 is preferably enlarged substantially to promote aeration. The inner wall surfaces of pot 10 are coated with a waterproof sealant 54, such as paraffin wax or a wax blend of paraffin and viscous additives. This waterproof coating 54 is applied over the entire interior of porous container 10 to a preselected height, such height being increasable as a result of greater pot porosity inducing the vertical migration of wax. This coating 54 fills the pores of pot 10 and prevents water from entering into the interior of pot 10 in the region which is protected by the coating 54.

Figure 3:
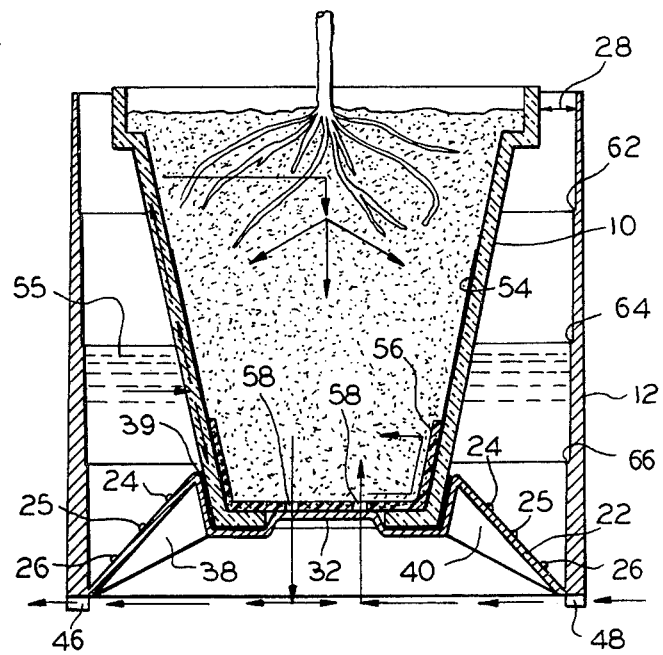
FIG. 3 is a schematic representation of the inventive system of FIG. 1, in elevation.
Figure 4:
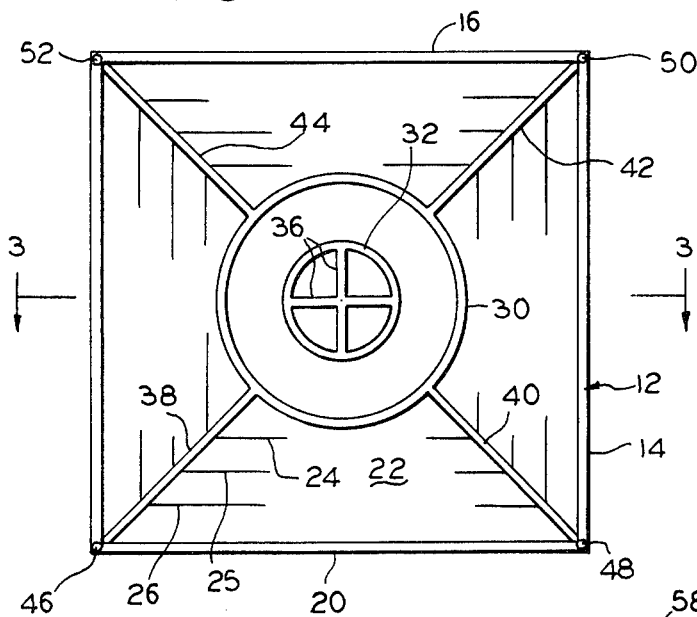
FIG. 4 is a plan view of the bottom of the inventive system.

If reservoir 28 is filled with water, moisture penetrates the porous outer wall of the clay pot and moves upwardly through the wall by capillary action. In the upper zone of the pot, which is uncoated, the soil is made wet by the moisture which is being so transferred by capillary action. Since moisture enters the soil mass in the upper region of the pot, a rain-like watering is reproduced, thereby promoting moisture "evenness." Moreover, by closing off a lower regions of pot 10 with the coating 54, the water is prevented from entering and concentrating at the base of the soil mass. The range of penetration and migration of coating 54, also selectively seals the pores of pot 10 in the regions where water would ordinarily be excessively absorbed and thereby substantially overcoming the variations in water transmission rates normally found in porous containers. Also, the moisture flow upwardly balances the hydraulic gradient caused by the water standing in the reservoir 28; therefore, by controlling the height 55 (FIG. 3) at which the water stands, the moisture may be more selectively metered by the distance of the capillary action.

The interior bottom region of clay pot 10 is loosely lined by a fitment 56 comprising a shallow tray having drainage holes 58 formed therein. Ideally, fitment 56 has a total outside surface area at least equal to the cross-sectional area of the top of clay pot 10. Fitment 56 is made of a material (such as foamed polystyrene) that is impervious to the passage of water, but enables a relatively free passage of gases. The fitment 56 also prevents the soil from escaping through the enlarged opening, at the bottom of pot 10.

The primary function of filment 56 is to increase the aeration and evaporation capacity of pot 10, as illustrated in FIG. 5. At the base of fitment 56 is a plurality of holes 58, which allows water to be freely evacuated at such times as the plant is flushed. However, since fitment 56 has a relatively uneven surface and fits loosely into the base of pot 10, many small passageways are formed between the coatings 54 and fitment 56, and through interstices in the fitment walls. Thus, air, represented by a plurality of arrows 60, may circulate through the holes between struts 36, the interstices, these passageways and into the soil mass through the fitment 56. Because the fitment 56 allows gas to pass through its walls, the actual aeration in the lower region of pot 10 is substantially greater than it would be through openings 58 alone.

The two component containers adhered by a seal 39 enables the inventive structure to be manufactured using a higher proportion of conventional components and equipment. Also, there is a reduction of tooling costs. When the outer container is slightly modified, it can be vacuum-formed in production employing sheet plastic and inexpensive molds.

According to the invention, means are provided for more carefully adjusting the moisture application to the specific requirements of various plant species. In greater detail, the user will be provided with a list that classifies each plant in accordance with its moisture requirement by, for example, a specific numerical value. In addition, the user will be required to consider two other major factors in determining how moisture input can be regulated. The first is the moisture consumption of the plant correlated by season. Increased plant growth needs more moisture during the summer than during the winter. The second is the ability of the soil to retain moisture (e.g., whether the soil is general purpose containing humus or peat moss or, alternatively, "conditioned" by aerating additives, e.g., sand, pearlite, etc.). By considering the moisture needs of the plant, the time of year and the type of soil, one can adjust the auto-moisturizing rate to suit practically all cultural requirements.

As an illustration, suppose that the plant growing in the inventive auto-moisturizing structure has an assigned numerical value of "10," which number relates to a method of providing average moisture. The user is instructed to add "1" to this number during summer or to subtract "1" from this number during winter. If a general purpose soil has been mixed with an equal amount of sand, pearlite, etc., the numerical value would be increased by (+1). Thus, in winter (−1), a plant having an assigned moisture value of 10 planted in "conditioned" soil (+1), retains the original value of "10." In the summer, this same plant would have a higher numerical value to insure increased moisture input.

The outer container 12 has graduated inner markings 62, 64, 66 and outer markings 70, 72, 74. These graduations are numbered to correspond to the numerical value calculated as herein described. Accordingly, the user is instructed to fill the reservoir 28 to the calibration level corresponding to the calculated numerical value. By so adjusting the height of the initial water level in the reservoir 28, the wicking distance of the capillary action is selected to control the rate of moisture transmission into the interior of pot 10.

A second water level adjustment enables certain plant species to be partially dried for selected periods of time. More specifically, the bottom 22 of outer container 12 has graduated markings 24, 25, 26 located on its interior surface. These indices may be visible either from the top of the reservoir 28 or through transparent sides if provided in outer container 12. Indices 24, 25, 26 are calibrated along the slanting bottom 22 to indicate the number of days which have elapsed since the water level 55 in the reservoir 28 evaporated below a level whereby moisture could be absorbed by the pot. As will be observed from FIG. 1, once the water level is below the uppermost part of bottom 22, it is no longer contacting the outer porous wall of container 10.

The invention is not necessarily limited to the particular structure and features shown and described herein. Quite the contrary, the structure may be adapted to the needs of both the manufacturer and the user. For example, the disclosed structure has no undercut sections so that it may be molded by simple and inexpensive tools. Also, the described combination of a clay pot and a simple plastic structure enables the use of conventionally available components. However, in alternative embodiments, the invention can also be practiced with special purpose structures. FIGS. 6 and 7 illustrate two embodiments incorporating these features. Each of these Figures incorporates the same reference numerals (with letter suffix) that are used in FIGS. 1-5; therefore, the description of the parts so identified will not be repeated here, except as necessary to explain the differences.

For example, the outer container 12a (FIG. 6) and the water-impervious "coating" 54a are integrally molded from plastic, as a single unit. A suitable cappilary device 10a may be in the nature of a cylindrical device which is open on both ends and is placed around the "coating" 54a. The porous side walls of device 10a function as the clay pot 10 functions to wick water into the soil. The water-impervious "coating" 54a and the porous side walls 10a are adhered by a watertight seal 39a.

The clay "pot" 10a (FIG. 6) rests on top of a frusto-conical base 22a which functions as the frusto-conical base 22 of FIG. 1 functions. In another embodiment (FIG. 7), the clay pot 10b does not extend downwardly below a point 80. Therefore, the water in reservoir 28b may fall below the bottom of the porous walls 10b and into the area indexed by the markings 24b, 25b, 26b. The portion 54b adjacent the porous pot 10b functions as the portion of pot 10, which is lined by coating 54, functions. The water impervious portion 54b and the porous side walls 10b are adhered by a watertight seal 39b.

If the entire pot 10 is made from plastic, either window areas or an upper edge may be formed therein at the height where the coating 54 terminates. Strips of clay, a clay pot, or the like, may then be inserted through the windows or set over the upper edge. Likewise, a different material having a crinkled surface and air-transmitting characteristics may be substituted for the fitment 56. It may also be desireable to mold an inner pot having a bottom surface area (in the region of fitment 56) with communicating passageways for air transfer.

Therefore, the appended claims should be construed to cover all equivalent structures.

I claim:

1. An auto-moisturizing system for plants comprising an inner porous pot sealingly adhered near its lower end within a larger outer water-impermeable container for forming a reservoir between said pot and said container, whereby water in said reservoir may make contact with said pot and wicks by capillary action up the porous side walls of the pot, means for surfacing a lower interior part of the pot with a substantially water-impermeable coating extending from substantially the lowest level at which soil may be contained upward to a predetermined height on the side walls to control the elevation at which the wicking water may contact potted soil through the porous walls, and both said pot and said container being adapted to provide aerating means positioned at a lower region thereof.

2. The system of claim 1 wherein said reservoir is formed in the space between said porous pot and said larger outer container, and graduation markings associated with said reservoir for indicating the distance which water in a partly empty reservoir must rise by said capillary action before it passes over the top of the impervious surfacing.

3. The system of claim 2 wherein some of said graduated markings are below the level where water in the reservoir makes contact with the porous pot, whereby a water level at said markings below said contact level indicates the time which has elapsed since said capillary action ceased, and therefore the duration of time during which the soil has been unwetted.

4. The system of claim 1 wherein said aerating means comprises means for draining water out and introducing air into the lower region of the pot.

5. The system of claim 4 wherein said aerating means has an area approximately the same as the exposed top area of the soil.

6. The system of claim 4 wherein said means for draining water and introducing air comprises a fitment for loosely lining the bottom of said pot, said fitment having gas-permeable walls which enable air to pass through but prevents passage of free liquid.

7. The system of claim 6 wherein said outer container includes a collar formed in its lower inside region, the lower portion of said pot nesting securely in said collar, and means between said collar and a select lower region of said pot for forming a waterproof adhesive seal therebetween.

8. The system of claim 1 wherein said impervious coating includes wax.

9. A watering system for plants comprising an outer container having side walls and a bottom wall rising upwardly therefrom for receiving and holding water, an inner container having a bottom region sealed to the upper part of the raised bottom of said outer container with drainage openings through the bottoms of said inner and outer containers, said openings being below the sealing said inner container comprising inner and outer layers, the inner layer being water-impervious and raising from substantially the lowest point at which soil is contained to a predetermined height and said outer layer having capillary characteristics and rising above said predetermined height.

10. The system of claim 9 wherein said outer layer is a clay material.

11. The system of claim 10 wherein said inner layer is a plastic material.

12. The system of claim 11 wherein said plastic material is a wax which is applied over said clay material, to permeate pores at the surface of said clay.

13. The system of claim 11 wherein said clay material is applied over said plastic material.

14. A container in which plants may grow, said container comprising a substantially conventional clay pot secured with a waterproof seal inside a larger water-receiving outer container, thereby forming a leakproof reservoir between said clay pot and outer container, water-resistant means lining the region in the interior of said clay pot opposite the region where water stands in said reservoir, thereby preventing free liquid contact between said standing water and soil inside said pot, whereby moisture reaches said soil only by capillary action from said reservoir up the walls of said clay pot and over said lining.

15. The container of claim 14 wherein said lining is a coating in intimate contact with said clay.

16. The container of claim 15 wherein said pot and said outer container mutually share at least one orifice in the lower region for draining water from and introducing air into soil within the pot.

17. The container of claim 16 wherein said waterproof seal surrounds said orifice.

18. The container of claim 16 wherein said outer container provides visible access to the side walls of said clay pot.

19. The container of claim 18 and calibration means which are in said visible access for indicating the level of water standing within said outer container.

20. The container of claim 19 wherein at least some of said calibration means are lower than a point on said pot which makes contact with water in said reservoir.

21. The container of claim 15 wherein the coating in the interior of said pot is a blend of wax for inhibiting the porosity of the clay over at least the entire side wall portion of said pot which lies below said predetermined height, and said predetermined height being selected to regulate moisture transmission and to be proportional to the original porosity of said pot, thereby converting the clay pot side walls into a moisture transmission line having uniform transmission characteristics.

22. A process for enabling most plant species to receive for extended periods a correct amount of moisture, said process comprising the steps of:

a. forming a water reservoir around the outside of a porous wall pot in which a plant may grow in a soil-like medium, b. forming a water-impervious coating around the inside of the lower part of said pot whereby water in said reservoir may enter soil in said pot only by wicking through said porous wall responsive to capillary action and over the top of said impervious coating, c. evaluating a plant's need for moisture according to a plurality of criteria, and d. furnishing control provisions for the level of water maintained in said reservoir in accordance with said evaluation in step (c) to limit and control the passage of water by adjusting the distance over which said water must wick through said porous wall in order to reach the top of said impervious layer.

23. The process of claim 22 and the further steps of:

e. extending said reservoir downwardly below the bottom region of said porous pot whereby the level of water in said reservoir may fall to a point where it can no longer wick through said porous walls, and f. marking the walls of said extended part of said reservoir to indicate the duration of a period during which the soil is not wetted.

24. The process of claim 23 and the further step of marking the container wall to indicate water levels according to said numerical values.

25. The process of claim 22 wherein step (c) includes the further steps of:

c.1 assigning a numerical value to plants according to the moisture needs of such plants, c.2 adjusting said numerical value according to seasonal changes, and c.3 further adjusting said numerical value according to the characteristics of soil in said pot.

26. The process of claim 22 and the further step of draining surplus water from and introducing air into the bottom of said porous pot.

27. The process of claim 26 and the added step of making the surface area for introducing air into the bottom of the pot equal to the area at the surface of said pot.

* * * * *